(12) United States Patent
Robins et al.

(10) Patent No.: US 7,000,055 B1
(45) Date of Patent: *Feb. 14, 2006

(54) MULTI-INTERFACE SYMMETRIC MULTIPROCESSOR

(75) Inventors: Kristen Marie Robins, San Jose, CA (US); Ronnie B. Kon, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 478 days.

This patent is subject to a terminal disclaimer.

(21) Appl. No.: 10/206,906

(22) Filed: Jul. 26, 2002

Related U.S. Application Data (63) Continuation of application No. 09/450,803, filed on Nov. 29, 1999, now Pat. No. 6,484,224.

(51) Int. Cl.
*G06F 13/38* (2006.01)
(52) U.S. Cl. .................................. 710/305; 710/52
(58) Field of Classification Search ................ 710/305, 710/52–57, 310; 709/213, 232, 102, 200; 370/412–413, 419
See application file for complete search history.

(56) References Cited

U.S. PATENT DOCUMENTS

| | | | | |
|---|---|---|---|---|
| 4,286,322 A | * | 8/1981 | Hoffman et al. | 718/103 |
| 4,439,763 A | | 3/1984 | Limb | 340/825.5 |
| 4,499,576 A | | 2/1985 | Fraser | 370/60 |
| 4,507,760 A | | 3/1985 | Fraser | 365/221 |
| 5,093,912 A | | 3/1992 | Dong et al. | 395/650 |
| 5,193,189 A | * | 3/1993 | Flood et al. | 718/103 |
| 5,255,291 A | | 10/1993 | Holden et al. | 375/111 |
| 5,268,900 A | | 12/1993 | Hluchyj et al. | 370/94.2 |
| 5,305,311 A | | 4/1994 | Lyles | 370/60 |
| 5,305,448 A | | 4/1994 | Insalaco et al. | 395/425 |
| 5,313,582 A | | 5/1994 | Hendel et al. | 395/250 |

(Continued)

*Primary Examiner*—Paul R. Myers
(74) *Attorney, Agent, or Firm*—Thelen, Reid & Priest LLP; David B. Ritchie (57) ABSTRACT

A symmetric multiprocessor system includes a first processor and a second processor for executing a multi-threaded process on packets, a first inbound interface and a first outbound interface associated with the first processor, a first task queue accessible for reading by the first processor, a second inbound interface and a second outbound interface associated with the second processor, and a second task queue accessible for reading by at least the first processor. The first inbound interface receives incoming packets and has a first input buffer maintaining a first input queue of the packets for processing by the first processor. The first outbound interface receives packets from the first processor and transmits outgoing packets. The first task queue receives packets output from at least the second processor and maintains another input queue of the packets for processing by the first processor and which are outgoing from the first outbound interface. The second inbound interface receives incoming packets and has a second input buffer maintaining a second input queue of the packets. The second outbound interface receives packets from the second processor and transmits outgoing packets. The second task queue receives packets output from at least the first processor and maintains another input queue of the packets for processing by the second processor and which are outgoing from the second outbound interface. The first processor executes a process thread on packets by requesting the packets from the first input queue and the first task queue in a predetermined manner. The second processor executes a process thread on packets by requesting the packets from the second input queue and the second task queue in a predetermined manner.

7 Claims, 8 Drawing Sheets

U.S. PATENT DOCUMENTS

| | | | |
|---|---|---|---|
| 5,339,311 A | 8/1994 | Turner .......................... 370/60 |
| 5,359,592 A | 10/1994 | Corbalis et al. ............... 370/17 |
| 5,371,887 A * | 12/1994 | Yoshida et al. ............. 718/107 |
| 5,408,472 A | 4/1995 | Hluchyj et al. ............ 370/94.1 |
| 5,421,012 A | 5/1995 | Khoyi et al. ................ 395/650 |
| 5,463,754 A | 10/1995 | Beausoleil et al. .... 395/200.08 |
| 5,513,172 A | 4/1996 | Shikama et al. ............... 370/13 |
| 5,517,662 A | 5/1996 | Coleman et al. ............ 395/800 |
| 5,561,669 A | 10/1996 | Lenney et al. ............ 370/60.1 |
| 5,570,360 A | 10/1996 | Klausmeier et al. .......... 370/60 |
| 5,604,900 A | 2/1997 | Iwamoto et al. ............ 395/621 |
| 5,619,691 A | 4/1997 | Katada et al. .............. 395/620 |
| 5,649,092 A * | 7/1997 | Price et al. .................... 714/15 |
| 5,734,654 A | 3/1998 | Shirai et al. ................ 370/396 |
| 5,742,830 A | 4/1998 | Elko et al. .................. 385/728 |
| 5,765,032 A | 6/1998 | Valizadeh .............. 395/200.65 |
| 5,778,365 A | 7/1998 | Nishiyama ..................... 707/9 |
| 5,838,915 A | 11/1998 | Klausmeier et al. ... 395/200.45 |
| 5,838,994 A | 11/1998 | Valizadeh .................... 395/876 |
| 5,924,098 A | 7/1999 | Kluge ........................ 707/100 |
| 5,925,099 A | 7/1999 | Futral et al. ................. 709/204 |
| 5,926,458 A | 7/1999 | Yin ............................. 370/230 |
| 5,941,964 A | 8/1999 | Young et al. ................ 710/100 |
| 5,946,647 A | 8/1999 | Miller et al. .................... 704/9 |
| 5,953,336 A | 9/1999 | Moore et al. ................ 370/395 |
| 5,959,990 A | 9/1999 | Frantz et al. ................ 370/392 |
| 5,966,547 A * | 10/1999 | Hagan et al. .................. 710/57 |
| 6,018,770 A | 1/2000 | Little et al. .................... 709/223 |
| 6,198,920 B1 | 3/2001 | Doviak et al. .............. 455/426 |
| 6,484,224 B1 * | 11/2002 | Robins et al. .............. 710/305 |

\* cited by examiner

ROUTING TABLE (R1)

| DESTINATION NETWORK | OUTPUT INTERFACE (PORT) |
|---|---|
| 1.0 | E0 |
| 2.0 | T00 |
| 3.0 | S2 |
| 5.0 | S0 |

MULTI-INTERFACE SYMMETRIC MULTIPROCESSOR

CROSS REFERENCE TO RELATED APPLICATION

This application is a continuation of claims priority on U.S. patent application Ser. No. 09/450,803, entitled "MULTI-INTERFACE SYMMETRIC MULTIPROCESSOR", filed on Nov. 29, 1999, in the name of the same inventors and commonly owned herewith, issued into U.S. Pat. No. 6,484,224, with an issue date of Nov. 19, 2002.

BACKGROUND OF THE INVENTION

1. Field of the Invention

The present invention relates to the field of computer systems for data communications networks. More particularly, the present invention relates to a symmetric multiprocessor system having a plurality of interface devices, and a method for operating the system.

2. The Background

Routers are an essential element of internetworks, an example of which is the Internet. Routers allow (or deny, if necessary) communications between LANs (local area networks) and WANs (wide area networks). Routers transfer packets of data from one network to another and one major task of routers is the switching and forwarding of data packets. A router receives many packets through its multiple interfaces, and a network input/output (NetIO) process (program) and/or port ASIC (application specific integrated circuit) handles incoming packets received on inbound interfaces and outgoing packets sent to outbound interfaces. A router also performs other processes such as configuration, management, maintenance and updating of the system.

Recent rapid expansion of data communications networks has brought pressure for higher performance in network devices such as routers and switches in order to handle the increasing network traffic load. One solution for realizing improved performance of a computer system or a network device, such as a router, is to provide the system with a plurality of microprocessors (CPUs) that execute individual processes simultaneously. Such a microprocessor system, in which a number of microprocessors share memory, I/O (input/output) devices, and other resources, is called a symmetric multiprocessing (SMP) system. A SMP system typically uses a single operating system (OS) to control the microprocessors and a high-speed bus to provide communication among the components of the SMP system. Any idle processor in a SMP system can be assigned any task or process and additional microprocessors can be added to improve the performance of and deal with increased loads on the SMP system. The task of parceling out processes to each component microprocessor of the SMP system may be handled by the OS of the system or by an application program running outside the OS. Although symmetric multiprocessing can produce significant performance gains under ideal conditions, the resources of the system must be allocated to the concurrently running processes in a reasonable manner. In addition, overhead increases as more microprocessors are added to the system.

Multithreading of a process (or task) also generally provides improved performance of a computer system. Multithreading allows different parts (threads) of a single program or process to be executed simultaneously. A thread is a portion of a program or process that can operate independently of other portions of the program or process. In a multithreaded application, all the threads can run at the same time without interfering with one another, if so programmed. In a multiprocessor system, the OS, which is capable of executing such a multithreaded program, allots the threads of the program to the microprocessors. However, it is often difficult to divide a program in such a way that separate microprocessors can execute different portions of it without interfering with one another.

If a router utilizes a SMP system (without multithreading), the processes performed by the router can be executed concurrently by several microprocessors. For example, a NetIO process may run on one microprocessor, while other processes may run on other microprocessors. However, if the NetIO process restricts itself to single-threaded operation, its input/output performance is limited by the microprocessor executing NetIO process. The process drops packets when it is overloaded despite the fact that there may be a number of idle microprocessors in the SMP system which could, but are not adapted to handle the load. Alternatively, the NetIO process can be multithreaded so that each thread is processed by an available microprocessor. For instance, a first packet received on an interface is handled by a first microprocessor, the following packet is handled by a second microprocessor while the first microprocessor is busy processing the first packet, and so forth.

In this scenario of a multithreaded NetIO process, each interface of the router can be used by any of the available microprocessors at any time. A NetIO forwarding process typically receives a packet on an inbound interface, switches the packet based on its destination address, and sends the packet to an outbound interface. Thus, one switching and forwarding process for a packet usually involves an inbound and an outbound interface, the result being that each of the microprocessors executing the NetIO process may have to access any interface of the router. Therefore, it is necessary to adopt some measure such as a mutex or scheduler to prevent more than one microprocessor from accessing the same interface at the same time. That is, the "right to use" each interface device must be dynamically allocated among the microprocessors and must not overlap. For example, using a scheduler, a process thread on each microprocessor is "awakened" when the interface becomes available to that microprocessor. However, this approach has the undesirable effect of dramatically slowing the router's switching performance.

Moreover, the multithreaded NetIO process may cause another problem known as "packet reordering" when successive packets arriving at an interface constitute a unit of information such as a single data file or an audio or video stream. When the first arriving packet is handled by a first microprocessor and the following packet by a second microprocessor, the second microprocessor may reorder the packets either because it thinks that the second packet should have arrived before the first packet or simply because it completes its task before the first microprocessor. When the reordered packet arrives on the interface, a third microprocessor, rather than the second microprocessor, may handle that third packet, resulting in another potential packet reordering. If the NetIO process is to avoid having more than one microprocessor handle the different interfaces, it is required to perform context switching (forcing one microprocessor to handle a particular packet stream so as to maintain packet ordering within the stream). Such context switching also significantly increases overhead and thus lowers the observed performance of the router or switch.

BRIEF DESCRIPTION OF THE INVENTION

A symmetric multiprocessor system includes a first processor and a second processor for executing a multi-threaded process on packets, a first inbound interface and a first outbound interface associated with the first processor, a first task queue accessible for reading by the first processor, a second inbound interface and a second outbound interface associated with the second processor, and a second task queue accessible for reading by at least the first processor. The first inbound interface receives incoming packets and has a first input buffer maintaining a first input queue of the packets for processing by the first processor. The first outbound interface receives packets from the first processor and transmits outgoing packets. The first task queue receives packets output from at least the second processor and maintains another input queue of the packets for processing by the first processor and which are outgoing from the first outbound interface. The second inbound interface receives incoming packets and has a second input buffer maintaining a second input queue of the packets. The second outbound interface receives packets from the second processor and transmits outgoing packets. The second task queue receives packets output from at least the first processor and maintains another input queue of the packets for processing by the second processor and which are outgoing from the second outbound interface. The first processor executes a process thread on packets by requesting the packets from the first input queue and the first task queue in a predetermined manner. The second processor executes a process thread on packets by requesting the packets from the second input queue and the second task queue in a predetermined manner.

DETAILED DESCRIPTION OF THE PREFERRED EMBODIMENTS

Those of ordinary skill in the art will realize that the following description of the present invention is illustrative only and not in any way limiting. Other embodiments of the invention will readily suggest themselves to such skilled persons having the benefit of this disclosure.

Figure 1:
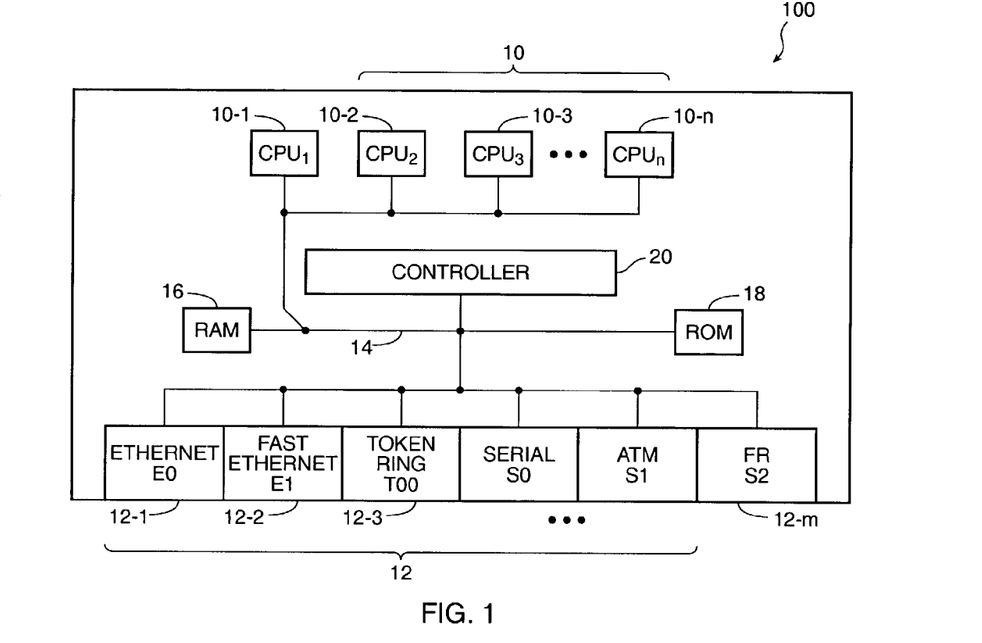
FIG. 1 is a diagram schematically illustrating an example of the structure of a symmetric multiprocessor system in accordance with one presently preferred embodiment of the present invention.

FIG. 1 schematically illustrates an example of the structure of a symmetric multiprocessor system 100 according to an embodiment of the present invention. The symmetric multiprocessor system 100 includes a plurality of microprocessors (CPUs) 10 (10-1, 10-2, . . . , 10-n, where n is an integer greater than 1) (collectively referred to as 10), and a plurality of interface devices 12 (12-1, 12-2, . . . , 12-m, where m is an integer greater than 1) (collectively referred to as 12). The system 100 also includes a main memory (RAM) 16, a read only memory (ROM) 18, and a controller 20, which are connected to the microprocessors 10 via a bus 14. The controller 20 may be implemented in a controller chip or another microprocessor.

In this embodiment, the multiprocessor system 100 is utilized in a network device such as a router, though the present invention is applicable to any computer system having multiple microprocessors and multiple interface devices. In order to support various types and methods of communication and different protocols (network protocols as well as switching protocols), a router typically includes multiple interface devices. For example, as shown in FIG. 1, the SMP system 100 (as a router), may include one or more interface devices 12 such as Ethernet (port E0), Fast Ethernet (port E1), Token Ring (port To0), Serial Connection (port S0), ATM (port S1), Frame Relay (port S2), and similar data communications interfaces. Not all of these types need to be present and there may be multiple instances of one or more types.

The SMP system 100 may employ an operating system such as the Cisco IOS™ product, available from Cisco Systems, Inc. of San Jose, Calif., or another convenient operating system to handle a multiprocessor system with multiple interface devices. Packets are received on and sent from interface devices 12. Each of the interface devices 12 preferably includes an inbound interface for receiving packets and an outbound interface for sending data packets, although there is no requirement that each interface support two-way communication. Interface devices 12 are connected to microprocessors 10 and controller 20 via a bus 14.

Figure 2:
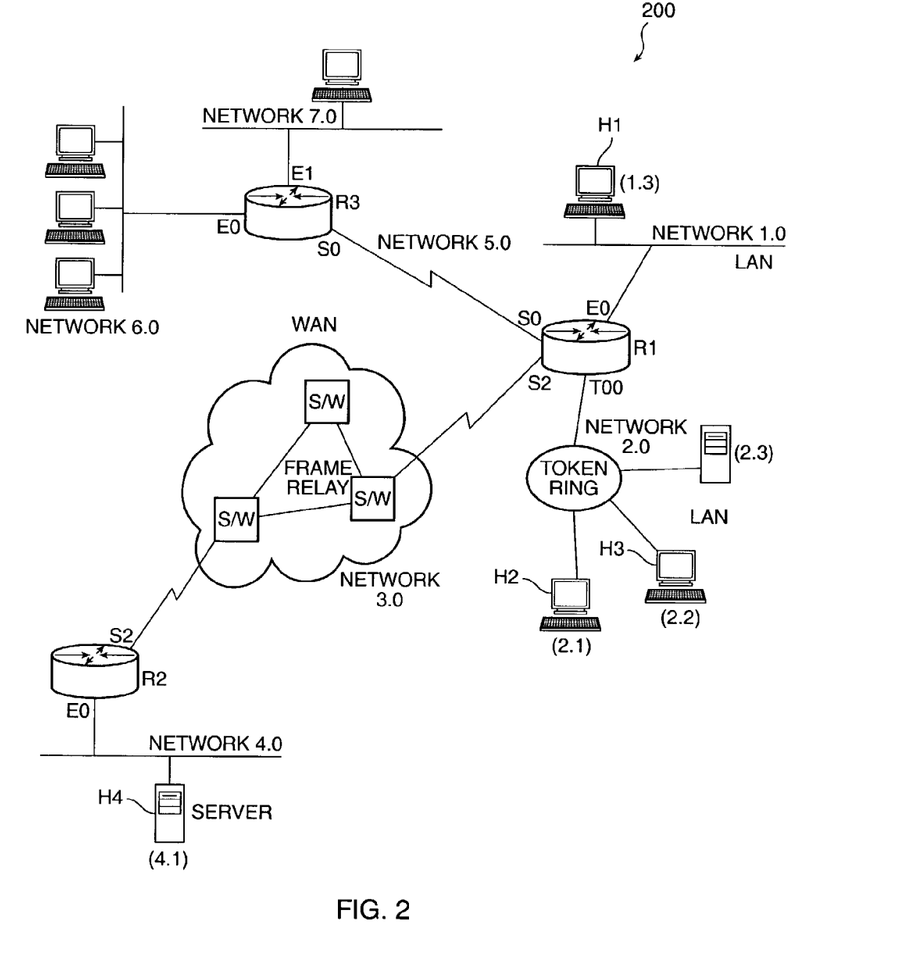
FIG. 2 is a diagram illustrating an example of an internetwork.

FIG. 2 illustrates an example of an internetwork 200. The internetwork 200 includes a variety of LANs (such as Ethernet network 1.0 and Token Ring network 2.0) interconnected through private and public (Internet) WAN links (such as network 3.0). These links are implemented with network devices such as routers and switches. For example, packet traffic sent from a source host H1 at address 1.3 on Ethernet network 1.0 to a destination host H2 at address 2.1 on Token Ring network 2.0 is routed by a router R1 (LAN-to-LAN routing). The router R1 is responsible for finding the path for the LAN hosts. A packet sent from a workstation H3 at address 2.2 on the Token Ring LAN 2.0 traverses three data links (Token Ring, Frame Relay, and Ethernet) to reach a file server H4 at address 4.1 on Ethernet network 4.0. This is an example of a LAN-to-WAN-to-LAN routing. The router R1, frame relay switches on the network 3.0, and router R2 participate in this routing.

Figure 3:
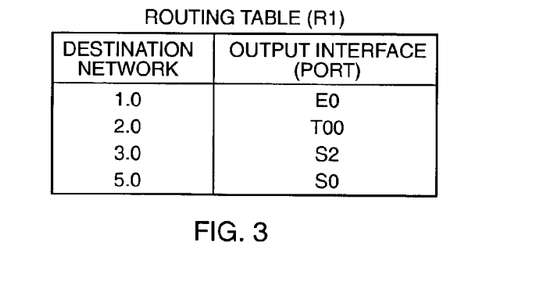
FIG. 3 is a diagram showing an example of a routing table for a router.

As shown in FIG. 2, the router R1 is connected to four networks: Ethernet network 1.0, Token Ring network 2.0, network 3.0 (Frame Relay WAN), and network 5.0 (serial connection), and the router R1 is responsible for forwarding packets from one of these networks to another. In order to determine the best path to use to forward a packet, a router has a routing table. FIG. 3 shows an example of a routing table for the router R1. The routing table contains an association between destination network addresses and the corresponding output interfaces or ports. When the router R1 checks its routing table entries for the packet from the source host H1 (address 1.3) to destination host H2 (address 2.1), it discovers that the path to the destination address 2.1 uses an outgoing port To0, the interface to the Token Ring LAN 2.0.

Figure 4:
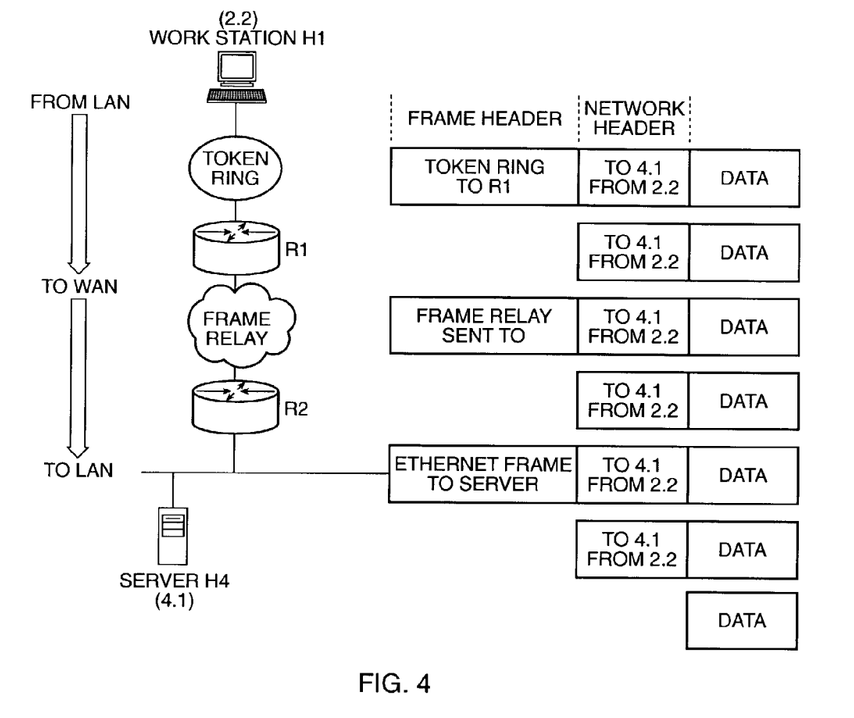
FIG. 4 is a diagram illustrating an example of encapsulation and decapsulation processes performed on a packet sent through data-links of different types.
Figure 5:
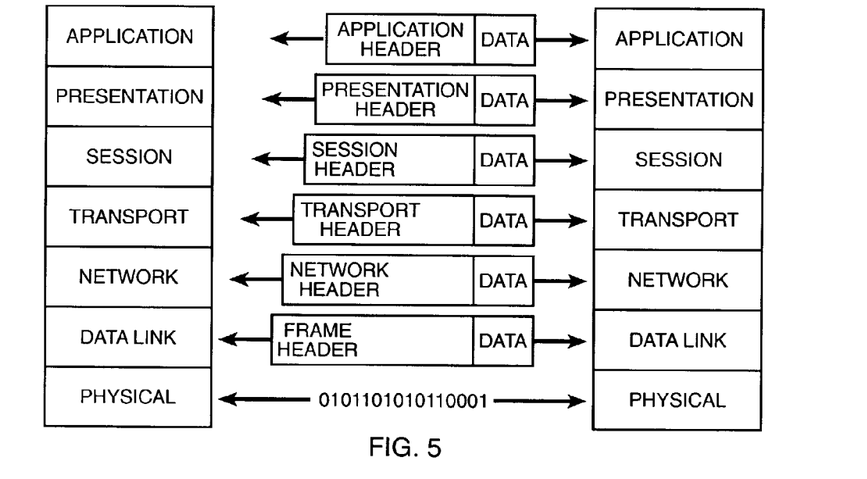
FIG. 5 is a diagram illustrating the OSI (Open Systems Interconnect) reference model.

As an internetwork grows, the path taken by a packet includes several relay points and a variety of data-link types, such as the path of the packet from the source host H3 to the destination sever H4. Encapsulation and decapsulation enables a packet to be sent over these different data links. FIG. 4 illustrates an example of such encapsulation and decapsulation performed on a packet sent from the workstation H1 to the file server H4. This illustration is in accordance with the OSI (Open Systems Interconnect) reference model as shown in FIG. 5, which is well known to those of ordinary skill in the art.

As shown in FIG. 4, when the workstation H1 at address 2.2 sends a packet to the file server H4 at address 4.1, the packet is encapsulated in a Token Ring frame addressed to the router R1 at the data-link layer (data-link address in a frame header) and to the file server H4 at the network layer (network address 4.1 in a network header). When the router R1 receives the frame, it removes the packet from the Token Ring frame (that is, strips the frame header of the packet), finds a path for it, encapsulates it in a Frame Relay frame, and forwards the frame to the router R2. The router R2 removes the packet from the Frame Relay frame, and then forwards the packet to the file sever H4 encapsulating it in a newly created Ethernet frame. When the file server H4 receives the Ethernet frame, it extracts the packet and passes it to the appropriate upper-layer process. The routers R1 and R2 keep the source address and the destination address in the network layer unchanged, while appending a respective data-link layer address at the interface. The data-link layer address is an address appropriate for the next hop along the path. This encapsulation enables the LAN-to-WAN packet flow.

Returning to FIG. 1, the operating system of the SMP 100 is capable of executing a multithreaded program such as a network input/output (NetIO) process handling packets incoming and outgoing through various interfaces of SMP 100. The microprocessors 10 execute such a multithreaded process. The controller 20 controls the data flow between the microprocessors 10 and interface devices 12 and other resources such as RAM 16 and ROM 18.

In the SMP system 100, each interface device 12 is controlled by one designated microprocessor (or group of microprocessors acting as a unit) 10. Two or more interface devices 12 can be associated with one such designated microprocessor. One specific interface device 12 is not controlled by more than one such designated microprocessor.

Figure 6:
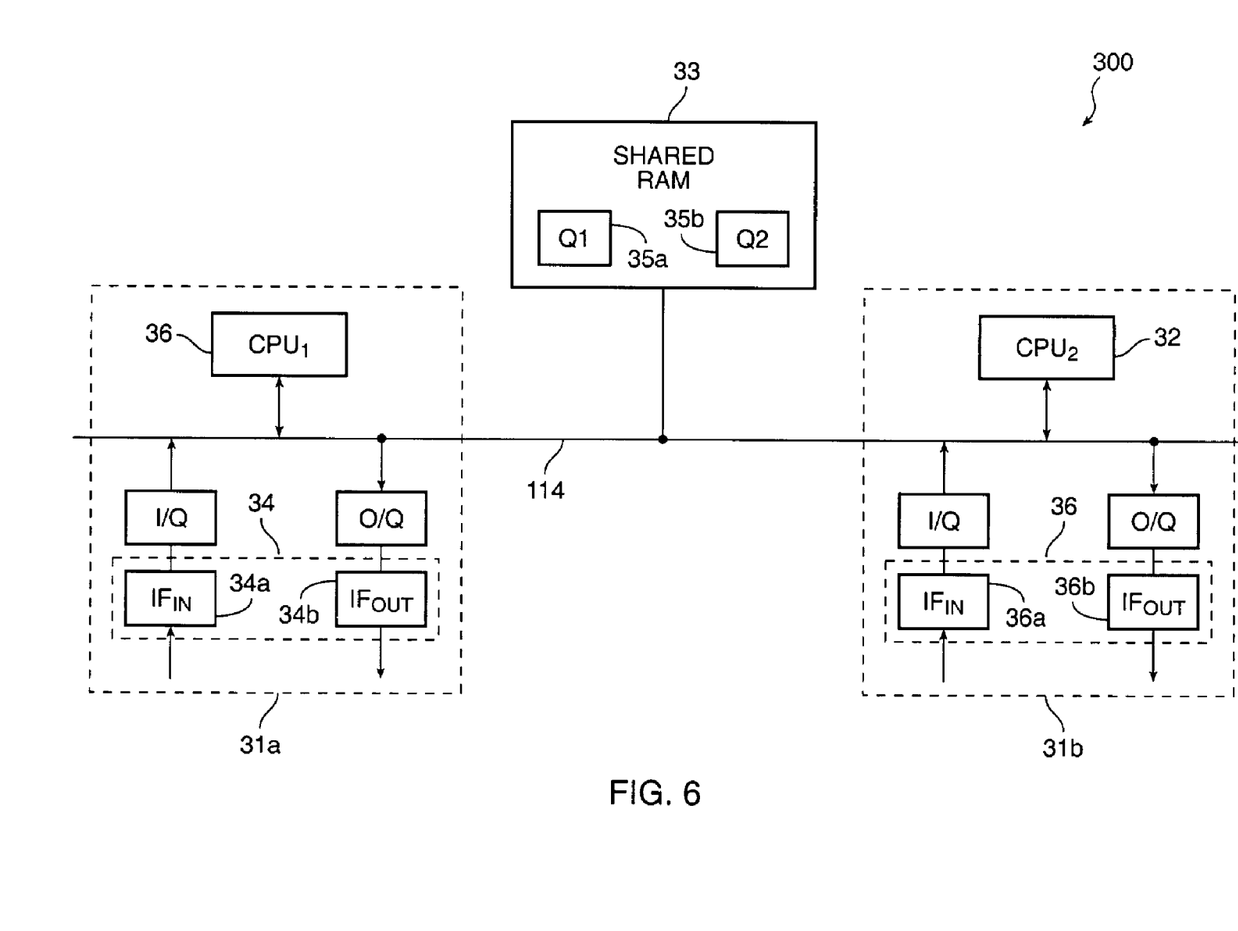
FIG. 6 is a diagram schematically illustrating a portion of a symmetric multiprocessor system in accordance with an embodiment of the present invention.

FIG. 6 illustrates a SMP system 300 according to a specific embodiment of the invention. Each interface device 34, 36 usually includes both an inbound interface 34a, 36a and an outbound interface 34b, 36b. SMP system 300 additionally includes at least a first microprocessor 30 and a second microprocessor 32. First interface device 34 is in communication with first microprocessor 30 and second interface device 36 is in communication with second microprocessor 32. Each microprocessor runs, for example, a packet forwarding thread and is responsible for switching any traffic on its corresponding interface device. In such a case, each microprocessor may be directly connected to the corresponding interface device, if desired, rather than being coupled to it via a controller.

The first and second microprocessors 30 and 32 are connected via a bus 114. The system 300 may also include a controller, a ROM, and other resources (not shown) which may also be connected to bus 114. Shared RAM 33 is also provided and is connected to bus 114 so that it may be accessed by both first microprocessor 30 and second microprocessor 32. First and second task queues 35a, 35b are maintained in shared RAM 33 for the purpose of providing communication between block 31a associated with first microprocessor 30 and block 31b associated with second microprocessor 32.

Any microprocessor may post (atomically or even non-atomically, but atomic posts are faster) to any other microprocessor's task queue, identifying a list of tasks that must be performed by the microprocessor associated with the task queue. (Tasks usually consist of switching a packet the rest of the way, but interface control commands could be posted there as well). Since each microprocessor governs a set of the available interfaces, all data/instructions for a particular interface are automatically routed to the correct microprocessor and posted to its task queue. Each microprocessor also listens for incoming packets on the interfaces that it owns. For example, assume that first microprocessor 30 "owns" first interface 34 and second microprocessor 32 owns second interface 36 and a packet arrives at first interface 34. As part of its normal operation, each microprocessor scans the interfaces it owns as well as its own task queue. First microprocessor 30 finds that a packet has arrived on first interface 34, so it reads the packet and performs decapsulation. First microprocessor 30 eventually determines that the packet needs to be routed out of second interface 36. First microprocessor 30 identifies the "owner" of second interface 36 as second microprocessor 32 (from a configuration table look-up, for example) and then constructs a task containing a request for further data processing; this task contains the pointer to the packet and the requested output interface (second interface 36). First microprocessor 30 then posts this task request to the task queue for second interface 36, which is second task queue 35b, the task queue for second microprocessor 32. First microprocessor 30 then continues with its normal processing; it has finished the work it needs to do for this packet.

Second microprocessor 32, as part of its normal operations, scans its task queue, second task queue 35b, and discovers that there is work to be done, so it picks up a task from the queue and begins processing it. In this case, it is the packet that first microprocessor 30 posted there; second microprocessor 32 then does the encapsulation work for the interface designated in the task request, and then sends the modified packet out the requested interface (second interface 36). Second microprocessor 32 then continues with its work, scanning the interfaces that it owns as well as its task queue (second task queue 35b).

Figure 7:
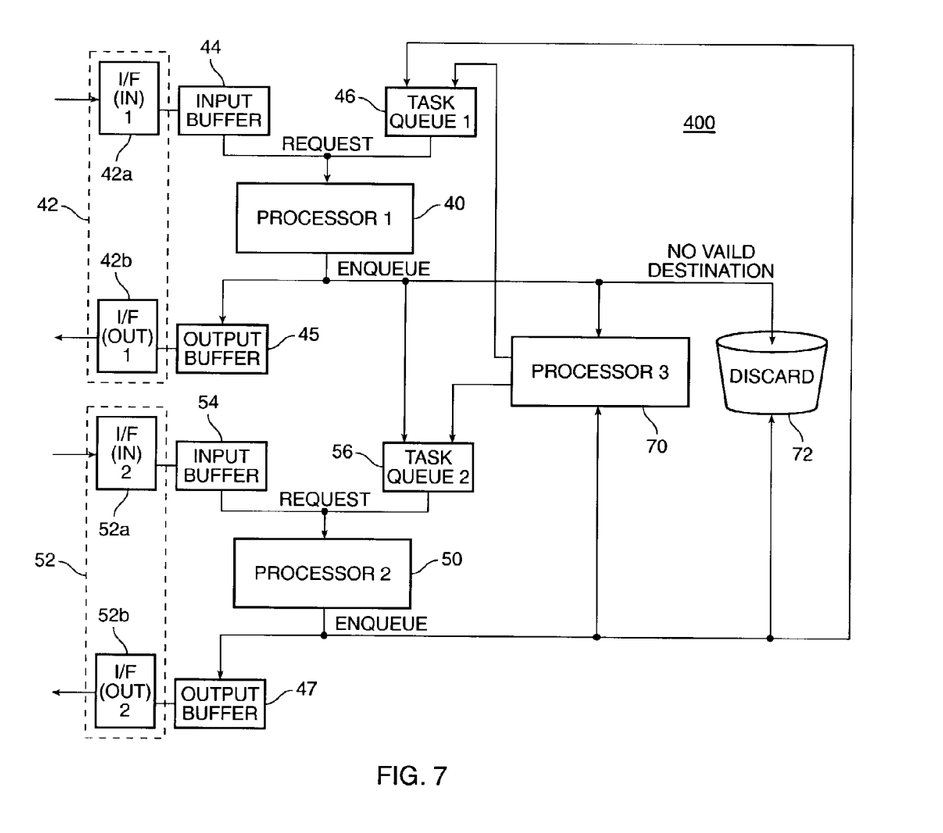
FIG. 7 is a functional block diagram illustrating operations of a symmetric multiprocessor system in accordance with an embodiment of the present invention.

FIG. 7 is a functional block diagram illustrating operation of a SMP system 400 in accordance with another specific embodiment of the present invention. The system 400 includes at least a first processor 40 and a second processor 50, a first interface 42 comprising a first inbound interface 42a and a first outbound interface 42b, both associated with first processor 40, a first task queue 46 accessible for reading by first processor 40, a second interface 52 comprising a second inbound interface 52*a* and a second outbound interface 52*b*, both associated with second processor 50, and a second task queue 56 accessible for reading by second processor 50.

The first and second processors 40 and 50 execute a multi-threaded process on packets, such as a network input output (NetIO) process. First processor 40 executes a first process thread of the NetIO process, and second processor 50 executes a second process thread of the NetIO process. First inbound interface 42*a* receives incoming packets and has an associated first input buffer 44 into which are placed received packets (or pointers thereto) to be processed by first processor 40. First outbound interface 42*b* receives packets output from first processor 40 and transmits the packets to their respective destinations. First task queue 46 receives packets output from at least second processor 60. The packets output to first task queue 46 are packets which are to be sent out through first outbound interface 42*b*. First task queue 46 maintains a queue of the packets to be processed by the first processor 40.

First processor 40 accesses the first input buffer 44 and first task queue 46 in a predetermined manner, and requests packets to process. After executing a process thread, first processor 40 outputs a packet to the first outbound interface 42*b* via first output buffer 45 when the packet is to be transmitted from the first outbound interface 42*b*. First processor 40 places a processed packet in second task queue 56 when the packet is to be transmitted from second outbound interface 52*b*. Accordingly, first processor 40 does not directly "touch" second outbound interface 52*b*, but enqueues the packet in second task queue 56 so that it is handled by the second processor 50 which is responsible for second interface 52.

Similarly, the second inbound interface 52*a* receives incoming packets. The second inbound interface 52*a* has an associated second input buffer 54 into which are placed received packets (or pointers thereto) to be processed by second processor 50. Second outbound interface 52*b* receives packets output from the second processor 50 via second output buffer 47 and transmits the packets to their respective destinations. Second task queue 56 receives packets output from at least first processor 40. Such packets are output to second task queue 56 when they are to be sent out through second outbound interface 52*b* which is controlled by second processor 50. Second task queue 56 maintains some of the packets to be processed by second processor 50. Second processor 50 sends a packet to second outbound interface 52*b* via second output buffer 47 when the packet is to be transmitted from second outbound interface 52*b*, and sends a packet to first task queue 46 when the packet is to be transmitted from first outbound interface 42*b*. In this manner, second processor 50 does not directly use first outbound interface 42*b*, but enqueues the packet in first task queue 46 so that it can be handled by first processor 40.

The SMP system 400 may also include a third processor 70 for executing another process or processes. The system 400 may also include one or more additional processors. Such additional processors or processes may include an upper layer process or application using the data contained in the packet. For instance, if a packet received on the first inbound interface 42*a* has as its destination system 400 itself, the packet should be handed to and processed by the appropriate process or application at system 400 rather than forwarded by the NetIO process. In such a case, first processor 40 transfers the packet to a third processor 70, which executes the application or other process or processes. Preferably, processor 70 has a buffer (not shown) and the first processor 40 places the packet in a queue in that buffer. Such a packet received on the second inbound interface 52*a* is handled by the second processor 50 in the same way.

Processes running on third processor 70 may want to send a packet from one of the outbound interfaces 42*b* and 52*b*. For example, system 400 may need to send its update information to other computer systems (such as neighboring routers) on an internetwork. When third processor 70 wants to send a packet through the first outbound interface 42*b*, it places the packet into first task queue 46. This allows first processor 40 to handle the packet instead of letting third processor 70 use the first outbound interface 42*b* which could cause a conflict. Similarly, a packet from third processor 70 that is to be sent out from the second outbound interface 52*b* is placed into second task queue 56, so as to be processed by the second processor 50. Packets processed in this manner may include, for example, routing table updates, pings, trace route requests, and the like.

The SMP system 400 may also include a discard buffer 72 for packets to be discarded when the packet has no valid destination or the packet's attempted access is unauthorized or should be prohibited. The first and second processors 40 and 50, and third processor 70, if present, place such a packet in the discard buffer 72, or simply drop it.

Figure 8:
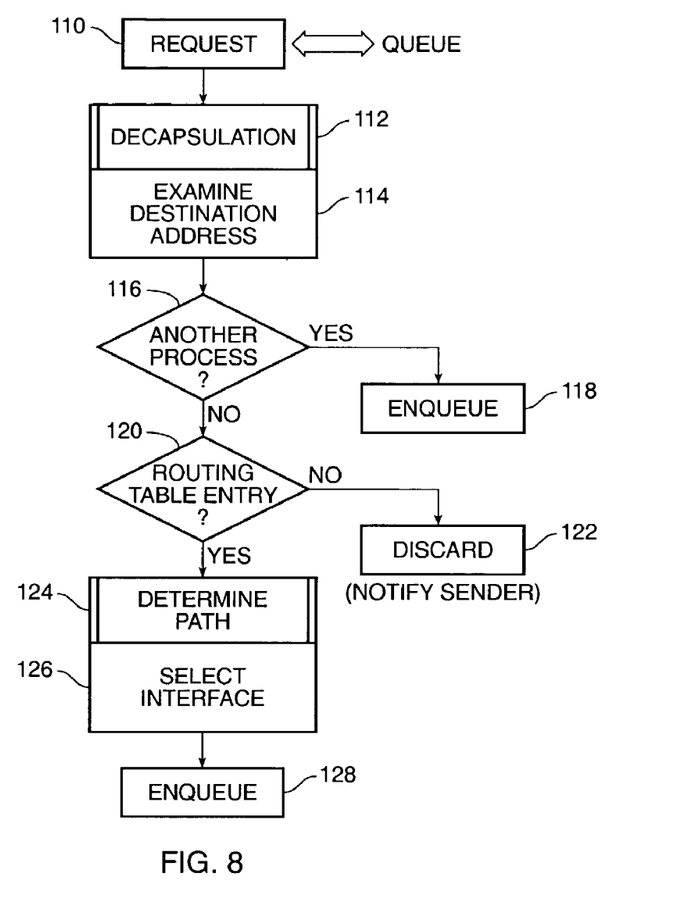
FIG. 8 is a process flow diagram illustrating a typical process thread executed on an incoming packet.
Figure 9:
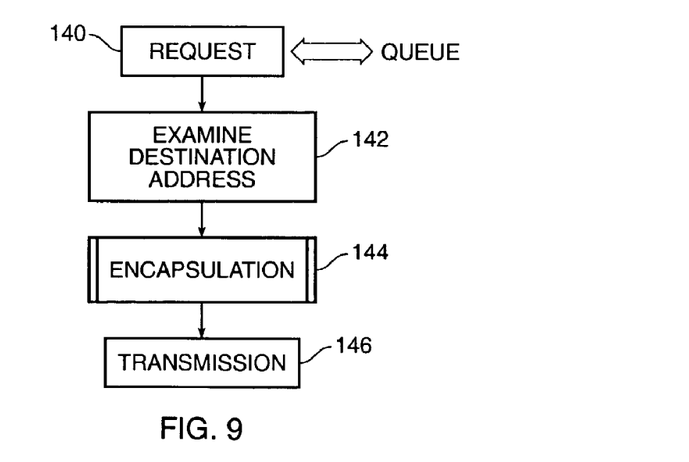
FIG. 9 is a process flow diagram illustrating a typical process thread executed on an outgoing packet.

FIGS. 8 and 9 show examples of a process thread executed on a requested packet by the first and second processors 40 and 50. Since the roles of the first and second processors 40 and 50 are symmetric in system 400, the operation is explained for the first processor 40 as an example.

The first processor 40 polls first input buffer 44 and first task queue 46 in a predetermined manner to determine if there is a packet waiting to be processed. For example, first processor 40 accesses first input buffer 44 and first task queue 46 alternately so as to scan the first input queue and the first buffer queue maintained therein. If there is any packet in the queues, first processor 40 obtains the packet and performs the process thread on it. First processor 40 may request packets from the first input buffer 44 a predetermined number of times and then from first task queue 46 a predetermined number of times. Alternatively, an interrupt system based upon interrupt generation upon packet receipt at either first task queue 46 or first input buffer 44 may be used. Each processor may operate similarly.

FIG. 8 illustrates a typical process thread executed on an incoming packet. First processor 40 makes a request for a packet from the first input queue as described above at block 110. The packet received on first inbound interface 42*a* has been encapsulated in a frame specific to the data-link type of the interface device, such as Ethernet, Token Ring, or the like. The packet goes through a decapsulation process at block 42 to be stripped of its frame header, and the destination network address is examined at block 114.

If the packet is to be processed by another process (block 116), the packet is passed to the appropriate process and the NetIO process thread has completed its work on that packet. For example, when a packet is addressed to the system 400 and contains data for another service or application, such as updating information for a routing table, the packet is transferred to (for example) third processor 70. The packet may be enqueued in a buffer of third processor 70 executing the appropriate process at block 118.

When the packet is to be switched or forwarded, a routing table is checked to determine whether the packet is routable or bridgeable at block 120. If there is no routing table entry matching the destination network address (invalid destination), the packet is neither routable nor bridgeable and is therefore dropped from the process as an unwanted packet. The packet may be simply discarded at block 122 and the sender may optionally be notified of the unreachable destination.

If the matching entry is found in the routing table, the path for the packet is determined in accordance with the routing table at block 124. An entry of the routing table indicates, for example, a destination network, some routing metric or state, and an outbound interface (or port) to use for forwarding the packet. The outbound interface is selected accordingly at block 126. The packet is placed in the task queue for the appropriate processor handling the selected interface (in this case, second task queue 56) at block 128. The remaining work on the packet (encapsulation and forwarding for transmission, for example) is processed by second processor 50.

If the destination network of a packet is the same as the source network, that is, the source host and the destination host are on the same network, the packet is sent out from first outbound interface 42b. In this case, the packet may be placed in first task queue 46 so that the packet is subject to an encapsulation process carried out by first processor 40 when it is requested from first buffer queue (as shown in FIG. 9). Alternatively, first processor 40 may complete the forwarding (encapsulation) process on that packet and output it to first outbound interface 42b, if the process thread is so programmed.

FIG. 9 illustrates a typical process thread executed on an outgoing packet. First processor 40 makes a request for a packet from first input buffer 44 in a manner as described above at block 140. The destination of the packet is examined at block 142 and the packet is encapsulated into a frame having the appropriated data-link address at block 144. The frame (or the frame header) is specific to the data-link type of first outbound interface 42b and suitable for communicating with the next directly connected network device on the link. Then, the packet is transmitted from the outbound interface at block 146.

A process thread is not limited to those examples shown in FIGS. 8 and 9. For example, a process thread on an outgoing packet may include another procedure and/or a link to another process such as a packet traffic management procedure for permitting or denying traffic. Such a process may be based on the source address, destination address, and/or protocol. Such traffic management may be performed, for example, by using an outbound access list defining the type of traffic that is permitted or restricted. Alternately, the traffic management may be executed by another processor by providing a link thereto (enqueuing) after examining the destination of the packet. In addition, this traffic management may be included in or linked from the process thread performed on an incoming packet by using an inbound access list.

Although each processor is responsible for switching any traffic arriving on and leaving from "its" assigned interface device, another task or process may temporarily need to have control (or "ownership") over the interface. For example, a chain maintenance task may need to access each interface device in the system. Thus, the right to control the interface device may have to be arranged in a certain manner. The polling operation by each processor may need to provide a break for allowing such an outside task or process to do such maintenance. This may be implemented, for example, by calling for a maintenance task after the processor executes a certain number of process threads or after processing a predetermined number of packets.

Figure 10:
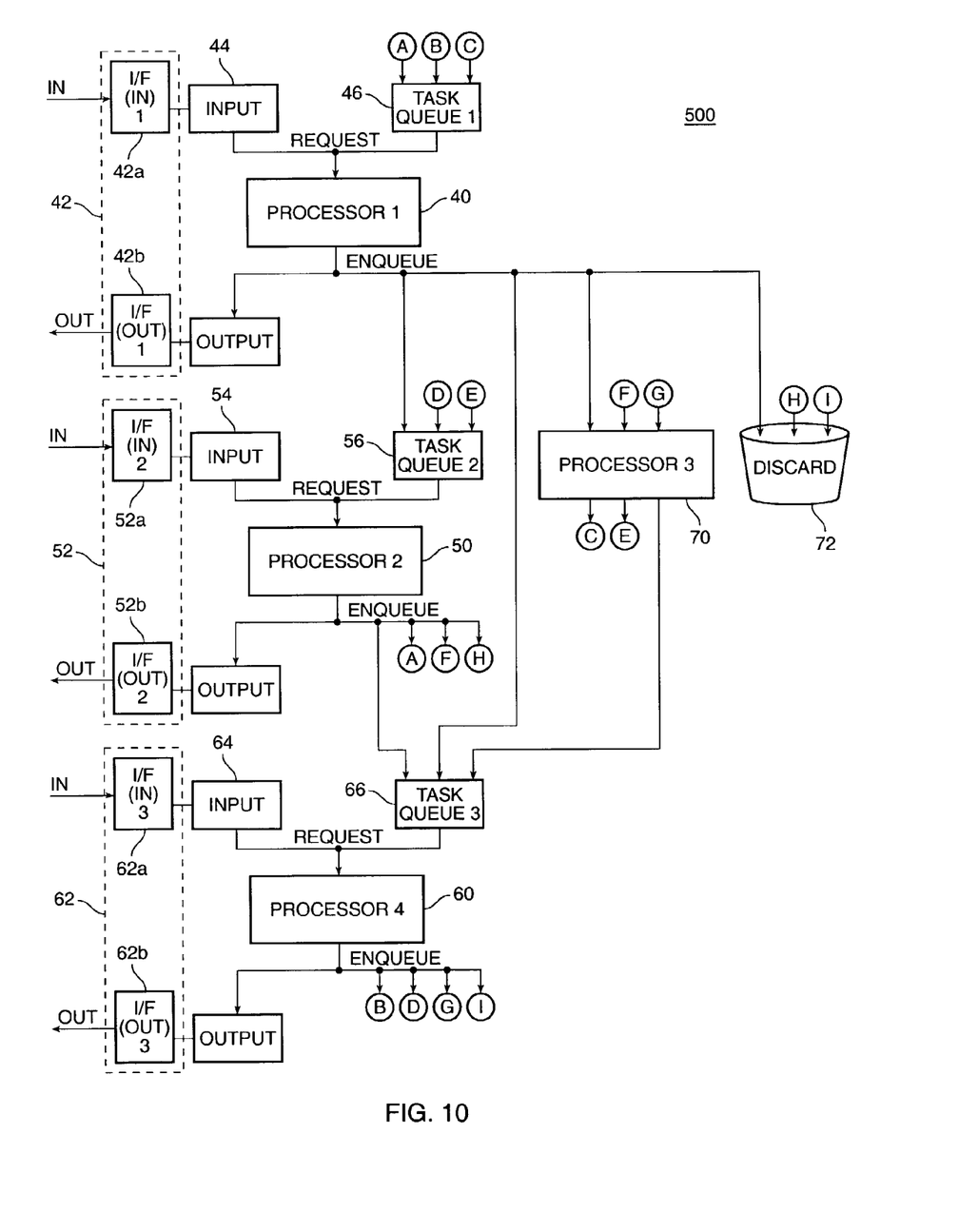
FIG. 10 is a functional block diagram illustrating operations of a symmetric multiprocessor system in accordance with an embodiment of the present invention.

FIG. 10 is a functional block diagram illustrating operations of a SMP system 500 according to another specific embodiment of the present invention. The system 500 includes a fourth processor 60, a third inbound interface 62a and a third outbound interface 62b, both associated with the fourth processor 60, and a third task queue 66 accessible for reading by the fourth processor 60, in addition to the components of the system 400 as described above. The processors operate in the same general manner as those in the system 400.

Figure 11:
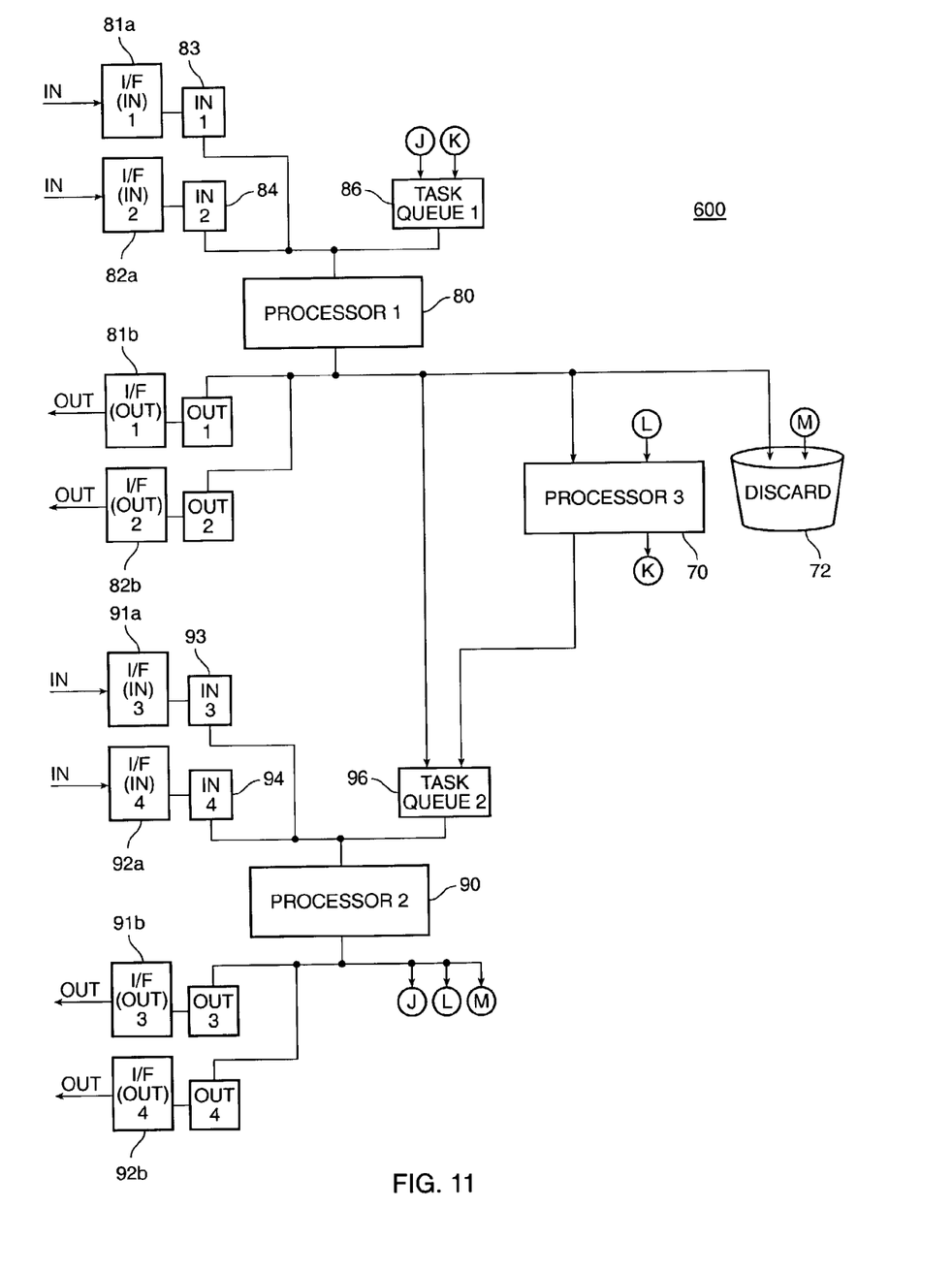
FIG. 11 is a functional block diagram illustrating operations of a symmetric multiprocessor system in accordance with another embodiment of the present invention.

FIG. 11 is a functional block diagram illustrating operations of a SMP system 600 according to another specific embodiment of the present invention. The system 600 includes a first processor 80 and a second processor 90, a first inbound interface 81a, a first outbound interface 81b, a second inbound interface 82a and a second outbound interface 82b, all associated with the first processor 80, a first task queue 86 accessible for reading by the first processor 80, a third inbound interface 91a, a third outbound interface 91b, a fourth inbound interface 92a and a fourth outbound interface 92b, all associated with the second processor 90, and a second task queue 96 accessible for reading by the second processor 90. The other structure of the system 600 is the same as that of system 400.

In the system 600, each microprocessor is responsible for two interface devices, each including an inbound interface and an outbound interface. If a packet is to be sent from one of the two outbound interfaces, the packet is enqueued in the task queue of the corresponding microprocessor. For example, first microprocessor 80 places a packet in second task queue 96 when the packet is to be sent from one of the third outbound interface 91b and the fourth outbound interface 92b. Second microprocessor 90 further processes the packet to assign it to one of its associated outbound interfaces 91b and 92b in accordance with the destination of the packet. Other operations of the system 600 are the same as those of the system 400.

Note that while each example shown herein includes an inbound and outbound interface corresponding to each interface device, one-way interface devices are also possible, such as input-only or output-only devices. It is also possible that the entire system might have a single inbound interface or a single outbound interface. The specific embodiments shown and described are more general and have wider applicability. The microprocessor and the corresponding interface device may be provided on the same card such as an Ethernet line card. The number of processors is not limited to two, as explained above, and the SMP system may contain any number of microprocessor-interface device set (s) and additional microprocessor(s) as deemed appropriate for the application. Finally, "Atomic writes" allow multiple queues to operate efficiently, so it is a preferable embodiment, but atomic instructions are not required for the invention to work.

While embodiments and applications of this invention have been shown and described, it would be apparent to those of ordinary skill in the art having the benefit of this disclosure that many more modifications than mentioned above are possible without departing from the inventive concepts herein. The invention, therefore, is not to be restricted except in the spirit of the appended claims.

What is claimed is:

1. A symmetric multiprocessor system comprising:
   a first processor;
   a first inbound interface associated with said first processor, said first inbound interface receiving tasks for processing by said first processor;

a first outbound interface associated with said first processor, said first outbound interface capable of receiving an output associated with tasks performed by said first processor;

a second processor;

a task queue readable by said second processor and writable by said first processor, said task queue receiving tasks for processing by said second processor; and a second outbound interface associated with second processor, said second outbound interface capable of receiving an output associated with tasks performed by said second processor.

2. A symmetric multiprocessor system comprising:

a first processor and a second processor for executing a multi-threaded process on packets;

a first inbound interface device associated with said first processor, said first inbound interface device receiving incoming packets and having a first input buffer accessible by said first processor, said first input buffer maintaining a queue of the packets received on said first inbound interface device;

a first outbound interface device associated with said first processor, said first outbound interface device receiving packets output from said first processor and transmitting said packets therefrom;

a second outbound interface device associated with said second processor, said second outbound interface receiving packets output from said second processor and transmitting said packets therefrom; and a task queue accessible for reading by said second processor, said task queue receiving packets output from at least said first processor, the packets in said task queue being transmitted from said second outbound interface device.

3. A symmetric multiprocessor system comprising:

a first processor and a second processor for executing a multi-threaded process on packets;

a first inbound interface device associated with said first processor, said first inbound interface device receiving incoming packets and having a first input buffer accessible by said first processor, said first input buffer maintaining a queue of the packets received on said first inbound interface device;

a second inbound interface device associated with said second processor, said second inbound interface device receiving incoming packets and having a second input buffer accessible for reading by said second processor, said second input buffer maintaining a queue of the packets received on said second inbound interface device;

an outbound interface device associated with said second processor, said outbound interface receiving packets output from said second processor and transmitting said packets therefrom; and a task queue accessible for reading by said second processor, said task queue receiving packets output from at least said first processor, the packets in said task queue being transmitted from said outbound interface device.

4. A method for operating a symmetric multiprocessor system including a first processor and a second processor for executing a multi-threaded process on packets, an inbound interface device associated with said first processor, a first outbound interface device associated with said first processor, a second outbound interface device associated with said second processor, and a task queue associated with said second processor, said method comprising:

receiving incoming packets on said first inbound interface device;

maintaining a queue of incoming packets received on said first inbound interface device in an input buffer;

requesting a buffer packet from said queue of packets in said input buffer;

executing a first process thread on said buffer packet;

sending said buffer packet processed by said first process thread to said task queue when said buffer packet is to be transmitted from said second outbound interface device; and outputting said buffer requested packet processed by said first process thread to said first outbound interface device when said buffer packet is to be transmitted from said first outbound interface device.

5. The method as defined in claim 4, further comprising:

requesting a task packet from said task queue;

executing a second process thread on said task packet; and outputting said task packet processed by said second thread to said second outbound interface device when said task packet is to be transmitted from said second outbound interface device.

6. A method for operating a symmetric multiprocessor system including a first processor and a second processor for executing a multi-threaded process on packets, a first inbound interface device associated with said first processor, a second inbound interface device associated with said second processor, an outbound interface device associated with said second processor, and a task queue associated with said second processor, said method comprising:

receiving incoming packets on said first inbound interface device;

maintaining a queue of incoming packets received on said first inbound interface device in a first input buffer;

requesting a first input buffer packet from said queue of packets in said first input buffer;

executing a first process thread on said first input buffer packet;

sending said first input buffer packet processed by said first process thread to said task queue when said first input buffer packet is to be transmitted from said outbound interface device;

requesting a task packet from said task queue;

executing a second process thread on said task packet; and outputting said task packet processed by said second thread to said outbound interface device when said task packet is to be transmitted from said outbound interface device.

7. The method as defined in claim 6, further comprising:

receiving incoming packets on said second inbound interface device;

maintaining a queue of incoming packets received on said second inbound interface device in a second input buffer;

requesting a second input buffer packet from said queue of packets in said second input buffer;

executing a third process thread on said second input buffer packet; and sending said second input buffer packet processed by said third process thread to said task queue when said second input buffer packet is to be transmitted from said outbound interface device.

* * * * *